(12) United States Patent
Kogawa

(10) Patent No.: US 9,191,972 B2
(45) Date of Patent: Nov. 17, 2015

(54) TRANSMITTING DEVICE AND TRANSMITTING METHOD

(75) Inventor: Tsuyoshi Kogawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/418,779

(22) Filed: Mar. 13, 2012

(65) Prior Publication Data

US 2013/0028110 A1    Jan. 31, 2013

(30) Foreign Application Priority Data

Jul. 26, 2011    (JP) .................................. 2011-163665

(51) Int. Cl.
*H04W 74/08* (2009.01)
*H04W 84/06* (2009.01)
*H04W 84/12* (2009.01)

(52) U.S. Cl.
CPC .......... *H04W 74/0808* (2013.01); *H04W 84/12* (2013.01)

(58) Field of Classification Search
CPC .......................... H04W 74/0808; H04W 84/12
See application file for complete search history.

(56) References Cited

U.S. PATENT DOCUMENTS

| | | | |
|---|---|---|---|
| 4,445,223 A | | 4/1984 | Jasper et al. |
| 7,512,096 B2* | | 3/2009 | Kuzminskiy et al. ......... 370/329 |
| 2002/0039888 A1 | | 4/2002 | Hama |
| 2004/0136396 A1* | | 7/2004 | Yonge et al. .................. 370/445 |
| 2005/0083962 A1* | | 4/2005 | Khun-Jush et al. ........... 370/445 |
| 2005/0180357 A1* | | 8/2005 | Tao et al. ...................... 370/329 |
| 2008/0069275 A1 | | 3/2008 | Horiguchi et al. |
| 2008/0151849 A1* | | 6/2008 | Utsunomiya et al. ......... 370/338 |
| 2009/0141696 A1* | | 6/2009 | Chou et al. .................... 370/345 |
| 2009/0203377 A1* | | 8/2009 | Kawasaki ................... 455/435.1 |
| 2010/0026547 A1 | | 2/2010 | Weissman et al. |
| 2011/0222524 A1* | | 9/2011 | Thomson et al. ............. 370/339 |
| 2012/0082070 A1* | | 4/2012 | Hart et al. ..................... 370/280 |
| 2013/0021967 A1* | | 1/2013 | Hwang et al. ................. 370/328 |

FOREIGN PATENT DOCUMENTS

| | | |
|---|---|---|
| JP | 57135375 A | 8/1982 |
| JP | 2002-111603 A | 4/2002 |
| JP | 2008072646 A | 3/2008 |
| JP | 2010154183 A | 7/2010 |
| JP | 2010171881 A | 8/2010 |
| JP | 2011530226 A | 12/2011 |

OTHER PUBLICATIONS

Japanese Office Action dated May 27, 2014 in counterpart Japanese Application No. 2011-163665.

* cited by examiner

*Primary Examiner* — Andrew Lai
*Assistant Examiner* — M Mostazir Rahman
(74) *Attorney, Agent, or Firm* — Holtz, Holtz, Goodman & Chick PC

(57) ABSTRACT

According to one embodiment, a transmitting device includes a transmitter configured to transmit a frame; a first carrier sensor configured to perform carrier sense in a wider bandwidth than a signal bandwidth to be used for a transmission of the frame by the transmitter; and an idle detector configured to determine whether the first carrier sensor succeeds in detecting an idle for a period that is equal to or more than a period for the transmitter to transmit the frame. The transmitter is configured to, when the idle detector succeeds in the idle detection, start the transmission of the frame after a lapse of a first period after the success of the idle detection.

16 Claims, 14 Drawing Sheets

FIG.1
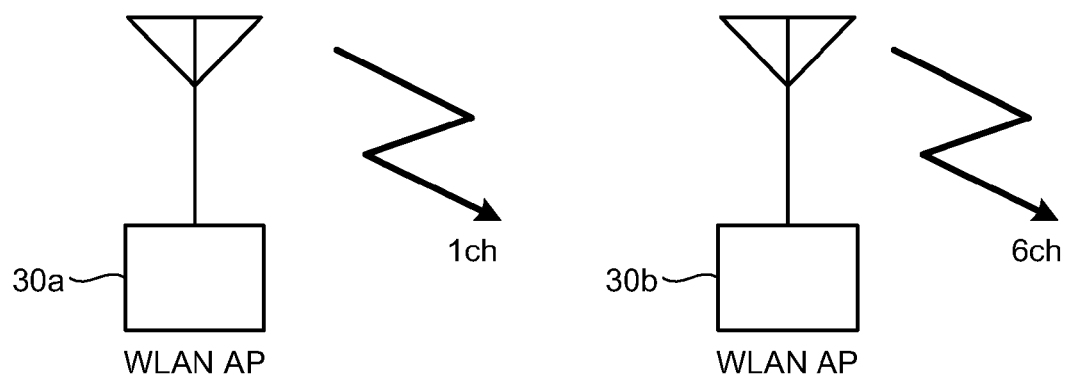
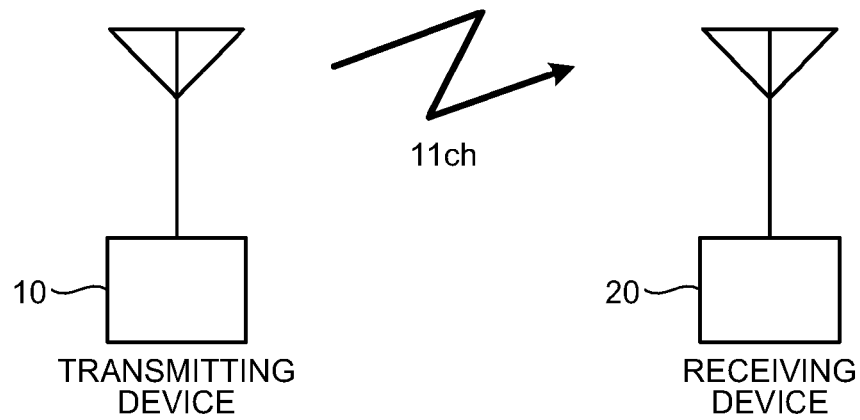

TRANSMITTING DEVICE AND TRANSMITTING METHOD

CROSS-REFERENCE TO RELATED APPLICATIONS

This application is based upon and claims the benefit of priority from Japanese Patent Application No. 2011-163665, filed on Jul. 26, 2011; the entire contents of which are incorporated herein by reference.

FIELD

Embodiments described herein relate generally to a transmitting device and a transmitting method.

BACKGROUND

Industry-Science-Medical (ISM) bands such as 2.4 GHz band are used by various types of industrial equipment. The industrial equipment generates electromagnetic waves that may interfere with wireless communication of communication devices for wireless communication. Some of the interference sources are electromagnetic waves having a periodicity. There is a possible method that detects the periodicity of the electromagnetic waves and performs wireless communication based on the detection result in order to avoid influence of the interference.

An exemplary interference source having the periodicity includes an unnecessary electromagnetic wave that is radiated from a microwave oven in a wide band in the 2.4 GHz band. Another exemplary interference source having the periodicity includes a beacon signal from access points (AP) of a wireless local area network (LAN) compliant with Institute of Electrical and Electronics Engineers (IEEE) 802.11b standard and IEEE 802.11g standard.

Recently, a following wireless communication method has been proposed. In this method, a transmitting device side performs transmission on a certain channel in the band while a receiving device side performs reception on all the channels in the band without a narrow band filter that extracts a signal on one channel in the band. This method can save the cost of the receiving device side.

Even in the case where the transmitting side performs transmission on the one channel while the receiving side performs reception on all the channels, the transmitting side can perform transmission on the one channel without being affected by the interference. However, a problem arises in that the receiving side is interfered by the electromagnetic wave that is radiated from another interference source.

BRIEF DESCRIPTION OF THE DRAWINGS

FIG. 1 is a conceptual diagram of a wireless communication system applicable to respective embodiments;

DETAILED DESCRIPTION

Figure 2:
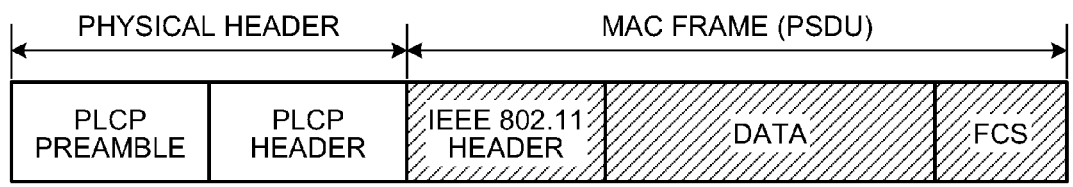
FIG. 2 is a schematic diagram of a frame format stipulated by IEEE 802.11b.

According to one embodiment, a transmitting device includes a transmitter configured to transmit a frame; a first carrier sensor configured to perform carrier sense in a wider bandwidth than a signal bandwidth to be used for a transmission of the frame by the transmitter; and an idle detector configured to determine whether the first carrier sensor succeeds in detecting an idle for a period that is equal to or more than a period for the transmitter to transmit the frame. The transmitter is configured to, when the idle detector succeeds in the idle detection, start the transmission of the frame after a lapse of a first period after the success of the idle detection.

Various embodiments will be described below in detail with reference to the accompanying drawings.

Wireless communication system applicable to respective embodiments

FIG. 1 conceptually illustrates a wireless communication system applicable to the respective embodiments. The wireless communication system includes a plurality of access points (WLAN AP) 30a and 30b, a transmitting device 10, and a receiving device 20. The access points 30a and 30b are, for example, access points for a wireless local area network (LAN) compliant with Institute of Electrical and Electronics Engineers (IEEE) 802.11b. The access points 30a and 30b each transmit beacon frames at a period of 102.4 msec on one channel in the 2.4 GHz band.

For example, assume that the access point 30a is configured to communicate with a station A (not shown), which has established an association with the access point 30a, in a frequency band of the first channel (hereinafter referred to as 1 ch) among the channels stipulated by IEEE 802.11b. The access point 30b is configured to communicate with a station B (not shown), which has established an association with the access point 30b, in a frequency band of the second channel (hereinafter referred to as 6 ch) among the channels stipulated by IEEE 802.11b.

The transmitting device 10 performs a transmitting process of wireless communication according to the respective embodiments. For example, the transmitting device 10 transmits a wireless signal that is receivable by the receiving side in a frequency band of the eleventh channel (hereinafter referred to as 11 ch) stipulated by IEEE 802.11b. The transmitting device 10 is configured to receive signals on the respective channels stipulated by IEEE 802.11b. For example, the transmitting device 10 is configured to receive the signal on 1 ch transmitted from the access point 30a and the signal on 6 ch transmitted from the access point 30b.

The receiving device 20 is configured to receive the signals in all the frequency bands stipulated by IEEE 802.11b. In other words, the receiving device 20 is configured to receive the transmission signal in a frequency band of the channel selected by the transmitting side among all the channels stipulated by IEEE 802.11b. The receiving device 20 is configured to demodulate the received signal and to control another electronic equipment coupled to the receiving device 20 in accordance with the demodulated signal.

The signals on 1 ch and 6 ch respectively transmitted from the access points 30a and 30b may interfere with the receiving device 20 when the receiving device 20 receives the signal on a specific channel transmitted from the transmitting device 10.

According to IEEE 802.11b, information is transmitted frame by frame. FIG. 2 illustrates a frame format stipulated by IEEE 802.11b. The frame includes a physical header at the head and a Media Access Control Frame (MAC) frame, which follows the physical header. The physical header includes a Physical Layer Convergence Protocol (PLCP) preamble (hereinafter simply referred to as preamble) and the PLCP header. The PLCP is a communication protocol for exchanging information on the physical layer such as a transmission rate and a frame length. The MAC frame includes the IEEE 802.11b header, the data part and the frame check sequence (FCS).

Figure 3:
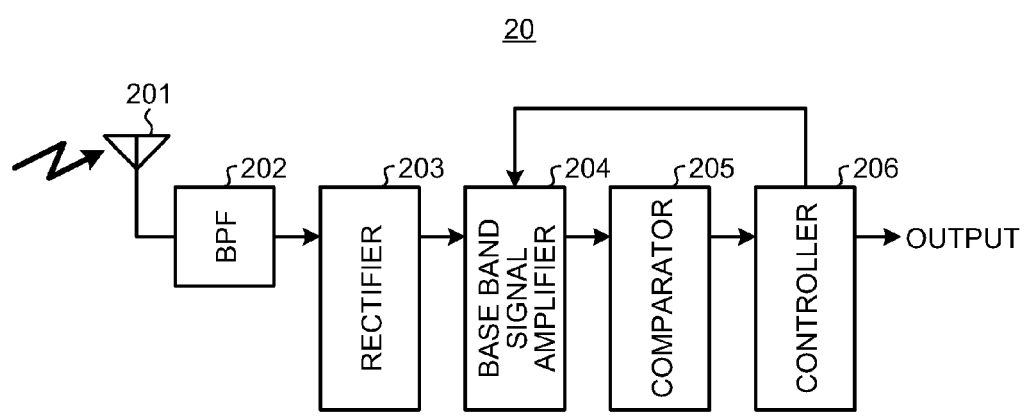
FIG. 3 is a block diagram illustrating an exemplary configuration of a receiving device applicable to the respective embodiments.

FIG. 3 illustrates an exemplary configuration of the receiving device 20 applicable to the respective embodiments. The receiving device 20 includes an antenna 201, a wide band pass filter (BPF) 202, a rectifier 203, a baseband signal amplifier 204, a comparator 205, and a controller 206. The controller 206 includes, for example, a central processing unit (CPU), a read only memory (ROM), and a random access memory (RAM). The controller 206 operates using the RAM as a working memory so as to control the whole receiving device 20 in accordance with the program stored in advance in the ROM.

The antenna 201 receives the radio wave, converts it into an electrical signal, and then outputs the electrical signal. The wide band pass filter 202 is a band-limiting filter that passes the frequency band range of all the channels stipulated by IEEE 802.11b and attenuates the electric power in other band ranges of the received signal supplied from the antenna 201. The rectifier 203 rectifies the received signal, the band of which is limited by the wide band pass filter 202, and extracts an envelope of the rectified signal. The rectifier 203 converts the received signal in high-frequency into the base band signal and then outputs the base band signal. This base band signal is amplified at the baseband signal amplifier 204 and is supplied to the comparator 205. The amplification factor of the signal at the baseband signal amplifier 204 can be controlled by the controller 206.

The comparator 205 compares a signal level of the base band signal, which is supplied from the baseband signal amplifier 204, with a threshold value. The comparator 205 outputs signal of high level (hereinafter referred to as H level) when the comparator 205 determines that the signal level of the base band signal is equal to or more than the threshold value based on the comparison result. On the other hand, the comparator 205 outputs signal of low level (hereinafter referred to as L level) when the comparator 205 determines that the signal level of the base band signal is less than the threshold value based on the comparison result. The threshold value may be a predetermined value or may be set in accordance with input from the controller 206.

The controller 206 receives the output signal of H or L level supplied from the comparator 205 and demodulates it. The controller 206 can control, for example, another electronic equipment coupled to this receiving device 20 based on the result of demodulation process.

The controller 206 can output a control signal to the comparator 205 so as to set the above-described threshold value. The controller 206 can output a control signal to the baseband signal amplifier 204 so as to control a gain of the baseband signal amplifier 204.

Figure 4:
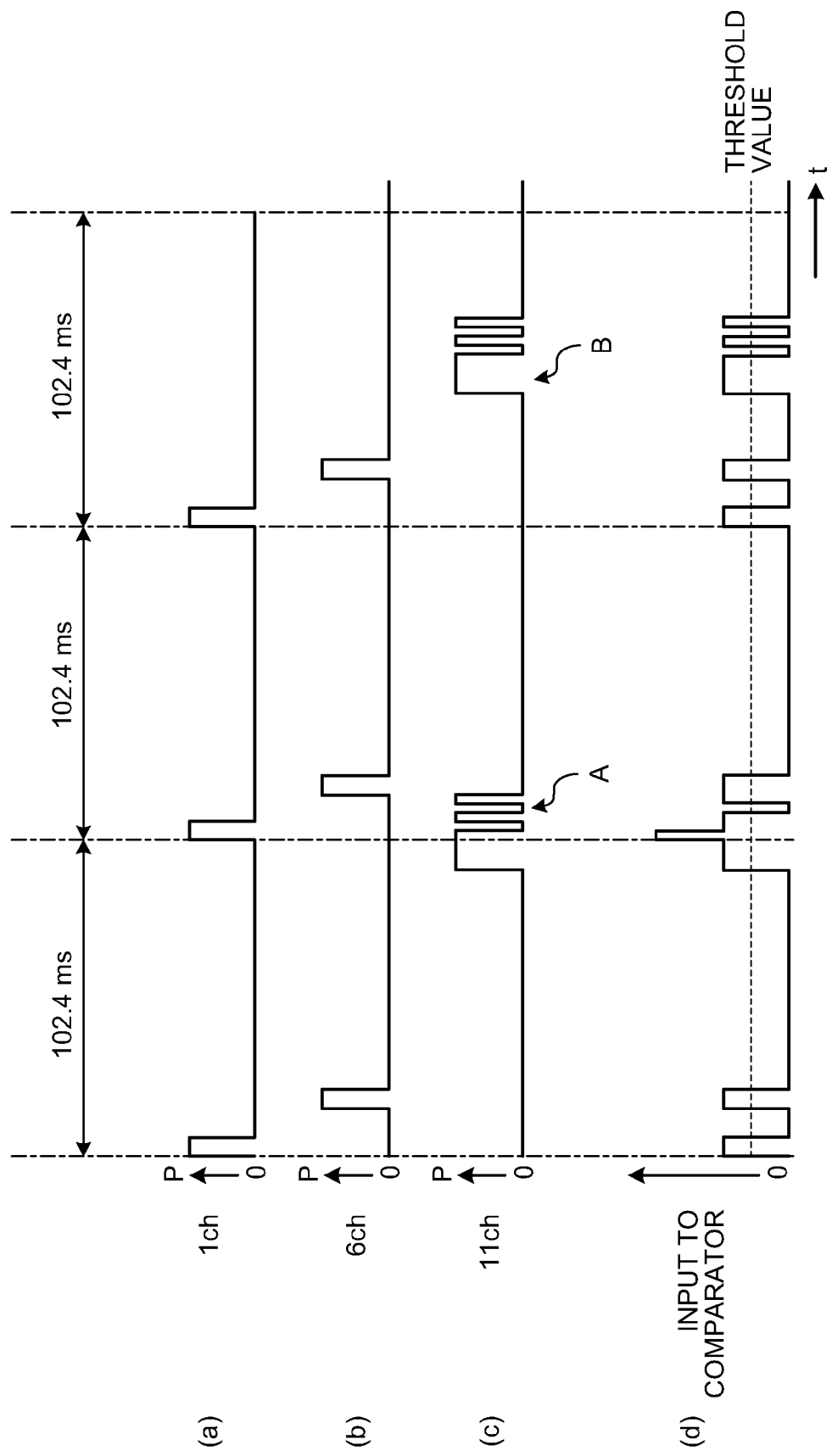
FIG. 4 is a schematic diagram illustrating a relationship between received powers at the receiving device and an input signal of a comparator.

FIG. 4 illustrates an exemplary relationship between received power levels at the receiving device 20 and a signal level that is input to the comparator 205 where the respective embodiments are not applied. In the example of FIG. 4, it is assumed that the receiving device 20 is located within the communication ranges of: the access points 30a and 30b of the wireless communication system described by referring to FIG. 1; and the transmitting device 10.

Parts (a) and (b) of FIG. 4 illustrate exemplary received power levels where the receiving device 20 receives beacon frames with a constant electric power at a period of 102.4 msec on 1 ch and 6 ch respectively transmitted from the access points 30a and 30b. These beacon frames on 1 ch and 6 ch are asynchronously transmitted. The transmitting device 10 transmits the signal using 11 ch at an arbitrary timing as illustrated in part (c) of FIG. 4. Part (c) of FIG. 4 illustrates two transmissions of the signals from the transmitting device 10 at the timings A and B.

These signals illustrated in parts (a) to (c) of FIG. 4 are received by the receiving device 20 after their respective propagation delays. The following describes on the assumption that the respective propagation delays are negligible small. A similar description applies even in the case where the propagation delay is not negligible. In the receiving device 20, these signals received at the antenna 201 are input to the comparator 205 through the wide band pass filter 202, the rectifier 203, and the baseband signal amplifier 204.

Since the receiving device 20 receives the signals on all the channels in the 2.4 GHz band, the input signal level at the comparator 205 is as exemplarily illustrated in part (d) of FIG. 4. Specifically, the signal on 11 ch received at timing A is affected by the beacon frames on 1 ch and 6 ch. This makes it difficult to precisely extract the signal on 11 ch based on the comparison result with the threshold value at the comparator 205, thus degrading communication quality. On the other hand, the signal on 11 ch received at timing B is not affected by the beacon frames on 1 ch and 6 ch. This allows to precisely extract the signal on 11 ch and does not degrade communication quality.

First Embodiment

Figure 5:
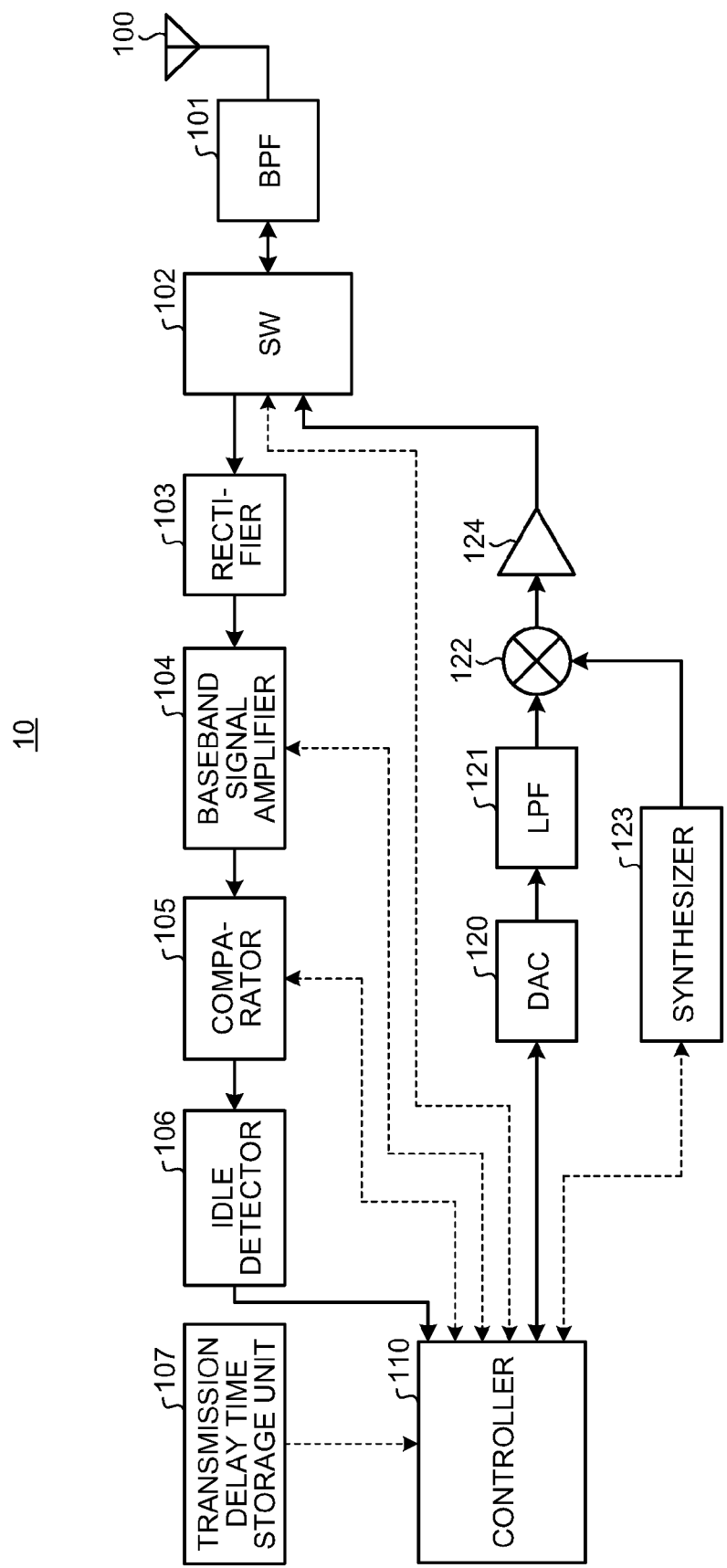
FIG. 5 is a block diagram illustrating an exemplary configuration of a transmitting device according to a first embodiment.

FIG. 5 illustrates an exemplary configuration of a transmitting device 10 according to a first embodiment. The transmitting device 10 has a configuration of a receiving side (a carrier sense side), which includes a rectifier 103, a baseband signal amplifier 104, a comparator 105, and an idle detector 106. The transmitting device 10 also has a configuration of a transmitting side, which includes a transmission delay time storage unit 107, a DAC (D/A converter) 120, a lowpass filter 121, a mixer 122, a synthesizer 123, and a power amplifier 124. Additionally, the transmitting device 10 has a common configuration for transmitting and receiving, which includes an antenna 100, a wide band pass filter (BPF) 101, a switch (SW) 102, and a controller 110.

The controller 110 includes, for example, a CPU, a ROM, and a RAM. The controller 110 runs a program stored in advance in the ROM and uses the RAM as a working memory so as to control the whole operation of the transmitting device 10.

The antenna 100 receives a radio wave, converts the received radio wave into an electrical signal, and outputs the electrical signal as a received signal. The antenna 100 also converts the electrical signal into a radio wave and transmits it. The wide band pass filter 101 is a band-limiting filter that passes the frequency band range of all channels stipulated by IEEE 802.11b and attenuates electric power in other band ranges of the received signal and the transmission signal. The switch 102 switches paths of the received signal and the transmission signal in accordance with control of the controller 110.

The configuration of the transmitting device 10 at the receiving side (the carrier sense side) will be described. The received signal, which is received by the antenna 100 and limited in bandwidth by the wide band pass filter 101, is supplied to the rectifier 103 through the switch 102. The rectifier 103 rectifies the received signal, which is limited in bandwidth by the wide band pass filter 101, and extracts an envelope of the rectified signal. The rectifier 103 then converts the received signal into a baseband signal and outputs it. The baseband signal is amplified by a baseband signal amplifier 104 and then supplied to a comparator 105. The baseband signal amplifier 104 has a signal amplification factor that can be controlled by the controller 110.

The comparator 105 compares a signal level of the baseband signal supplied from the baseband signal amplifier 104 with a threshold value. The comparator 105 outputs an H-level output signal when the comparator 105 determines that the signal level of the baseband signal is equal to or more than the threshold value based on a comparison result. The comparator 105 outputs an L-level output signal when the comparator 105 determines that the signal level of the baseband signal is less than the threshold value. The threshold value may be a predetermined value or may be set in accordance with input from the controller 110. The output signal of the comparator 105 is input into an idle detector 106.

The idle detector 106 detects an idle state based on the output signal of the comparator 105. The idle detector 106 determines whether the idle state can be continuously detected during a predetermined period of time. It is assumed that the idle detector 106 detects the idle state in the case where the comparator 105 outputs an L-level output signal.

The idle detector 106 determines whether the idle state can be continuously detected during the predetermined period of time. In the first embodiment, the predetermined period of time to output a success result of the determination is assumed to be a time (Tn+Tf) that is a sum of null time Tn and time Tf. Null time Tn is a time that is required for the receiving device 20 to accurately receive a next frame after a reception of an interference wave. Time Tf is a time that is required for data with the frame length to be transmitted. The predetermined period of time to output the success result of the determination will be referred to as a certain period of time (Tn+Tf) below.

Null time Tn is set within a range equal to or less than time Tpr (0≤Tn≤Tpr), which is required for the receiving device 20 to receive and to process preamble data included in the frame. The preamble is a known signal that is required to receive the frame at the receiving side. The preamble is usually transmitted at the head of the frame and used by the receiving side for edge detection, gain control, timing synchronization, and the like.

The idle detector 106 outputs the success result as a determination result, for example, when the idle state can be continuously detected during the certain period of time (Tn+Tf) within the predetermined period of time. On the other hand, the idle detector 106 outputs a failure result as a determination result when the idle state cannot be continuously detected during the certain period of time (Tn+Tf) within the predetermined period of time. The idle detector 106 sends the determination result to the controller 110.

When the determination result, which is sent from the idle detector 106, indicates the success result, the controller 110 outputs the transmission signal after a lapse of the transmission delay time Td according to the transmission delay time Td, which is stored in advance in the transmission delay time storage unit 107. The transmission signal, which is output from the controller 110, is supplied to the DAC 120.

In the first embodiment, a period obtained by subtracting the frame length Tf from a period of the interference wave is used as the transmission delay time Td. In the case where the interference wave is assumed to be a beacon frame stipulated by IEEE 802.11b, a period of the interference wave is 102.4 msec. The transmission delay time Td is stored in advance in the transmission delay time storage unit 107.

On the other hand, when the idle detector 106 sends the determination result indicating the failure result, the controller 110 does not output the transmission signal. At this time, the controller 110 may further output control information to a user interface (not shown) to notify the user of not transmitting.

Next, a configuration of the transmitting side of the transmitting device 10 will be described. The DAC 120 converts the transmission signal, which is supplied from the controller 110 as a digital signal, into the transmission signal in analog form. The transmission signal in analog form is supplied to the lowpass filter (LPF) 121. The lowpass filter (LPF) 121 performs a filtering process on the transmission signal so as to extract a baseband signal. The filtering process by the lowpass filter 121 is a process in which low-frequency components of the signal are passed through the lowpass filter 121 and high-frequency components of the signal are attenuated. The baseband signal, which is output from the lowpass filter 121, is supplied to one input port of the mixer 122.

On the other hand, the synthesizer 123 generates the high-frequency signal with a predetermined frequency in accordance with the control signal supplied from the controller 110 in a manner to convert the baseband signal into a signal with a frequency band of a specific channel. The high-frequency signal is supplied to the other input port of the mixer 122. The mixer 122 converts the baseband signal supplied from the lowpass filter 121 into a radio frequency (RF) signal using the high-frequency signal supplied from the synthesizer 123. This RF signal undergoes power amplification by the power amplifier 124 and is transmitted by the antenna 100 through the switch 102 and the wide band pass filter 101.

The controller 110 outputs a control signal to the comparator 105 so as to control the threshold value in the comparison process. The controller 110 outputs a control signal to the baseband signal amplifier 104 so as to control the gain in the amplifying process. Further, the controller 110 outputs a control signal to the switch 102 so as to switch signal paths. For example, when the controller 110 receives a transmission request of data through a user interface (not shown), the controller 110 couples the wide band pass filter 101 to the rectifier 103 and then performs the above idle detection determination process. The controller 110 couples the wide band pass filter 101 to the power amplifier 124 when outputting the transmission signal to the DAC 120.

Figure 6:
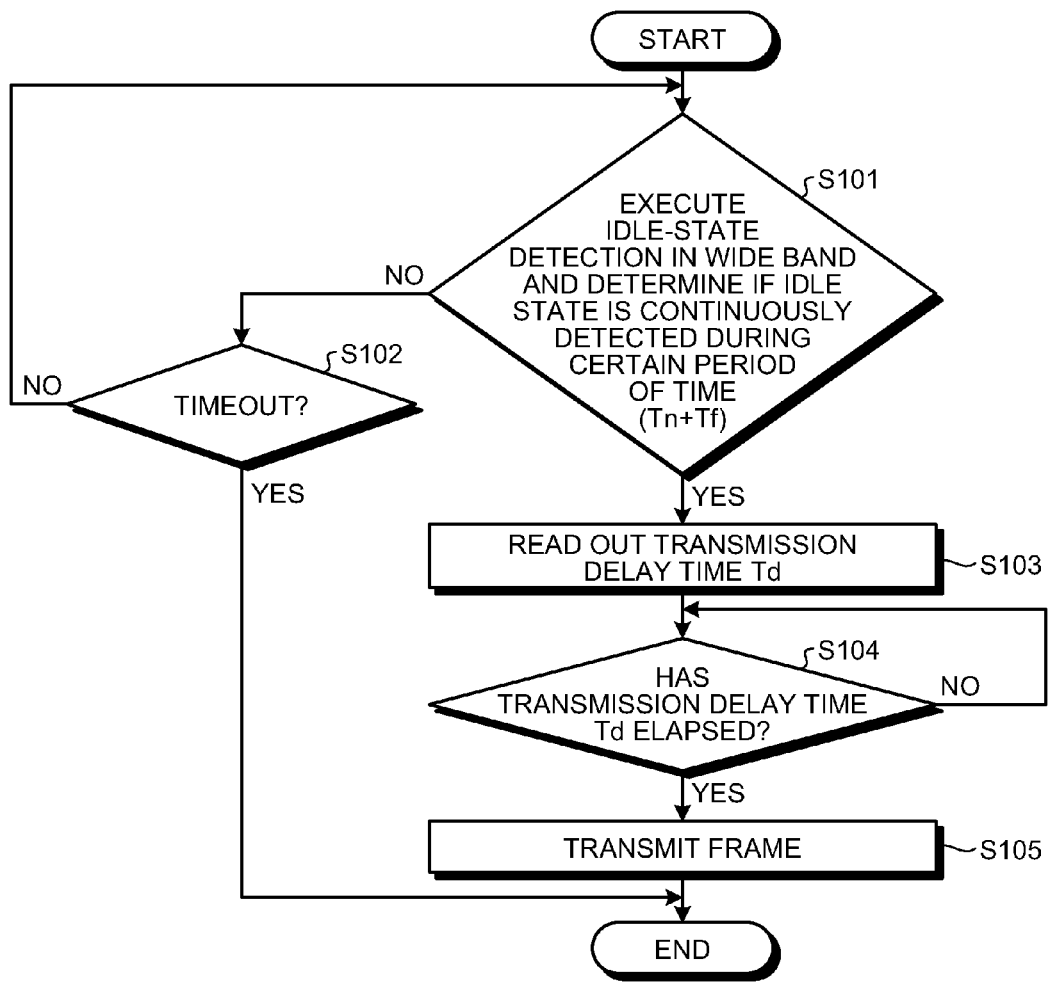
FIG. 6 is a flowchart illustrating an example of a CS process according to the first embodiment.

FIG. 6 is a flowchart illustrating an exemplary carrier sense process according to the first embodiment. When the controller 110 receives an instruction for transmitting from, for example, an upper layer (not shown), the controller 110 controls the switch 102 to couple the wide band pass filter 101 to the rectifier 103 and then starts the idle detection determination process. The received signal, which is output from the antenna 100, is supplied to the rectifier 103 through the wide band pass filter 101 and the switch 102 and is then rectified. The obtained baseband signal is supplied to the comparator 105 through the baseband signal amplifier 104 and then compared with the threshold value. A signal of L level or H level as the comparison result is supplied to the idle detector 106.

In step S101, the idle detector 106 determines whether the idle state is detected based on a comparison result supplied from the comparator 105. In the case where the idle detector 106 determines that the comparison result supplied from the comparator 105 is a signal of H level, which indicates that the idle state is not detected, the process proceeds to step S102.

In step S102, the idle detector 106 determines whether the predetermined period of time has lapsed after starting the idle detection determination process as a timeout. In the case where it is determined that the timeout has not occurred in step S102, the process returns to step S101 and continues detecting the idle state.

On the other hand, when the idle detector 106 determines that the timeout has occurred in step S102, the idle detector 106 outputs the failure result of the determination to the controller 110. When the controller 110 receives the failure result of the determination from the idle detector 106, the controller 110 terminates a sequence of processes according to the flowchart without performing frame transmission. At this time, the controller 110 may further output control information to a user interface (not shown) to notify the user of not transmitting.

In step S101, when the idle detector 106 determines that the comparator 105 supplies a signal of L level as the comparison result, which indicates that the idle state is detected, the idle detector 106 further determines whether the idle state is continuously detected during the certain period of time (Tn+Tf). When it is determined that the idle state is detected during the certain period of time (Tn+Tf), the idle detector 106 outputs the success result of the determination to the controller 110. When the controller 110 receives the success result of the determination from the idle detector 106, the process proceeds to step S103.

In step S103, the controller 110 reads a transmission delay time Td from the transmission delay time storage unit 107. In the following step S104, the controller 110 waits for the transmission delay time Td to elapse. In the case where it is determined that the transmission delay time Td has elapsed, the controller 110 advances the process to step S105, outputs the transmission signal to the DAC 120, and then transmits the frame.

Figure 7:
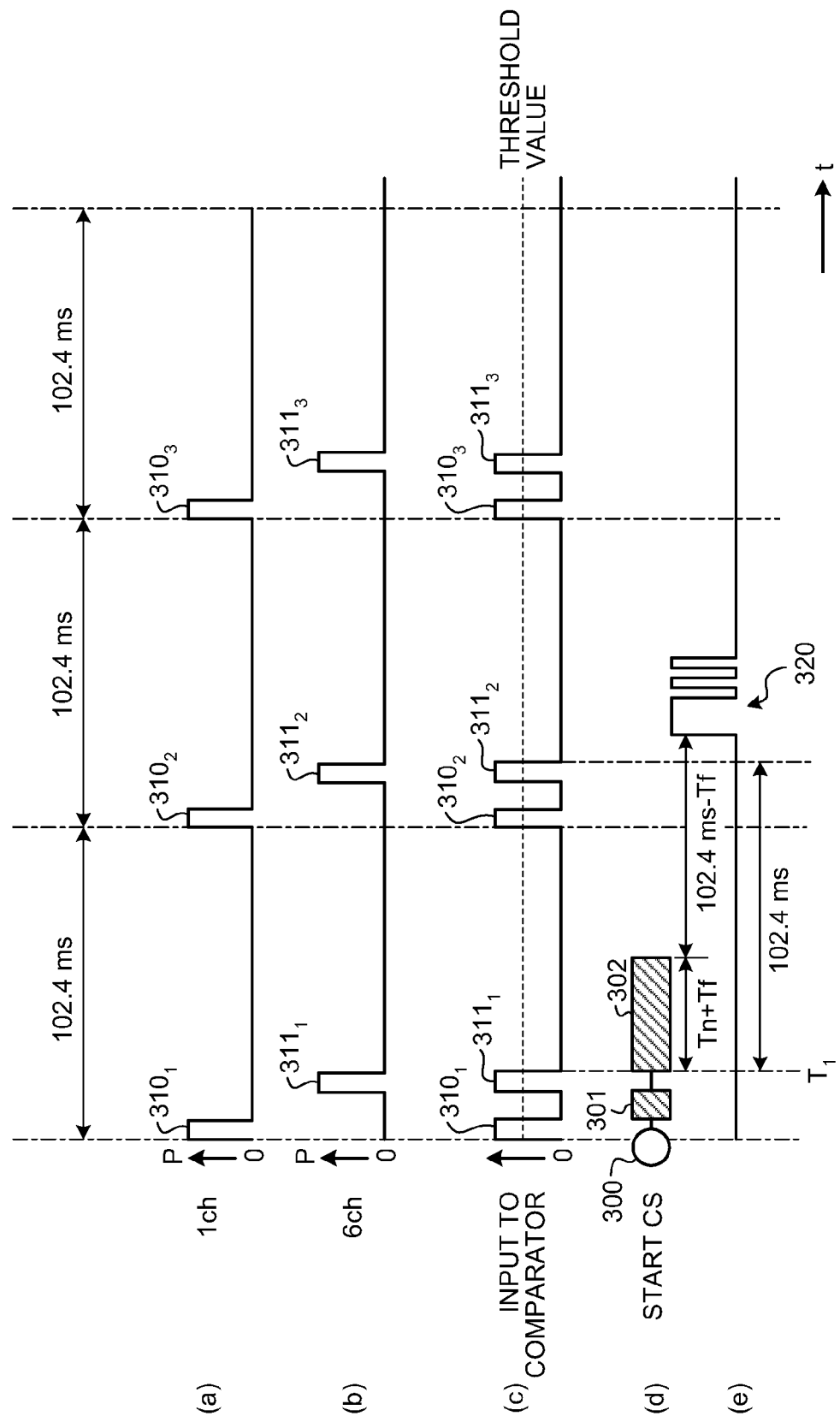
FIG. 7 is a schematic diagram illustrating the CS process according to the first embodiment and transmission timing.

FIG. 7 illustrates the carrier sense (CS) process and transmission timing control in the transmitting device 10 according to the first embodiment. Parts (a) and (b) of FIG. 7 respectively illustrate exemplary received power levels when the transmitting device 10 receives beacon frames transmitted at a period of 102.4 msec and a certain amount of electric power from the access points 30a and 30b using 1 ch and 6 ch. Part (c) of FIG. 7 illustrates an exemplary input signal of the comparator 105. This illustrates detections of the received signals $310_1$, $310_2$ and so on at H level of the beacon frames on 1 ch, and detections of the received signals $311_1$, $311_2$ and so on at H level in the beacon frames on 6 ch.

Part (d) of FIG. 7 illustrates the carrier sense process. It is assumed that the carrier sense is started at a timing 300 indicated by the circle in part (c) of FIG. 7. In this example, the output signal of the comparator 105 turns into L level at the end of the received signal $310_1$, and the idle state is detected. However, before the certain period of time (Tn+Tf) elapses from the end of the received signal $310_1$, the received signal $311_1$ turns the output signal of the comparator 105 into H level (time period 301).

From time $T_1$ at the end of the received signal $311_1$, the output signal of the comparator 105 turns into L level again, and the idle state is then detected. In this example, as shown in the time period 302, the idle state is continuously detected during the certain period (Tn+Tf) from time $T_1$. The success result of the determination is then output. When the success result of the determination is output, this shows that the idle state remains from the point of time $T_1$+102.4 msec until the period (Tn+Tf) elapses. The point of time $T_1$+102.4 msec is a time after a lapse of a period of one beacon frame after time $T_1$ at the head of the time period 302.

Transmission of a frame 320 starts after a lapse of a period, which is a sum of null time Tn and 102.4 msec, after time $T_1$. Practically, the transmission of the frame 320 may start after a lapse of a period, which is obtained by subtracting the frame length Tf from one period of the beacon frame of 102.4 msec, after the idle state is continuously detected during the certain period of time (Tn+Tf). This allows the receiving device 20 to receive and to demodulate the frame 320 without being affected by interference waves of the beacon frames illustrated in parts (a) and (b) of FIG. 7.

Figure 8:
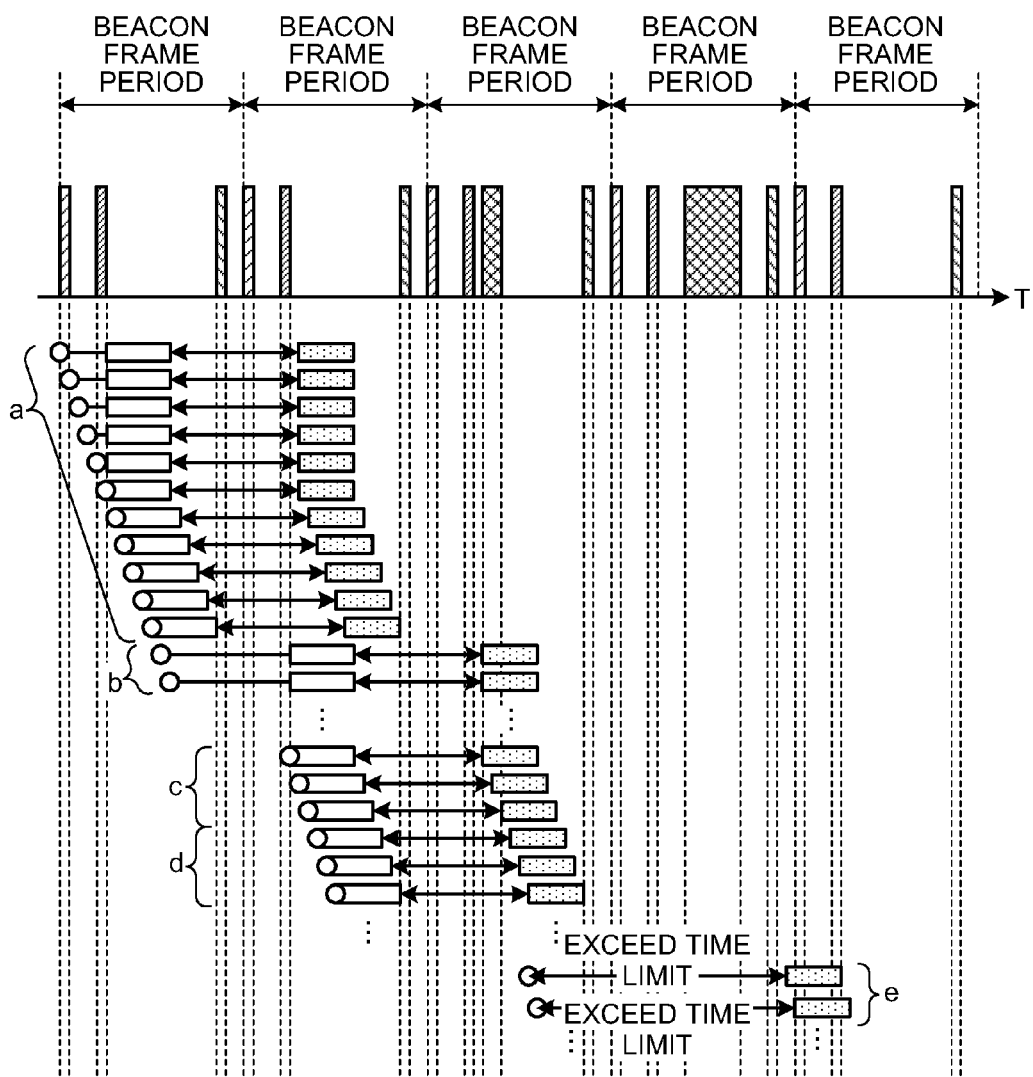
FIG. 8 is a schematic diagram illustrating a more actual example of idle-state detection.

FIG. 8 illustrates a more actual example of idle-state detection. In this example, it is assumed that communication environment of the transmitting device 10 and the receiving device 20 includes different 3 ch beacon frames of access points AP#1 to AP#3 and interference waves, which are radiated at arbitrary timings, other than the beacon frames.

In the example of FIG. 8, start times (which are indicated by the circles in the drawing) of carrier sense (CS) are shifted in incremental steps so as to detect the idle state during the certain period of time (Tn+Tf). It is attempted to determine whether the interference wave influences on the frame, which is transmitted after the transmission delay time Td, at the receiving device 20 side. As illustrated by group a and group d, if the interference wave, which is radiated at an arbitrary timing, does not exist during the frame length Tf after a lapse of the transmission delay time Td after detecting the idle state during the certain period (Tn+Tf), the receiving device 20 is not affected by any interference wave when receiving the frame transmitted by the transmitting device 10.

On the other hand, as illustrated by group b and group c, if the interference wave, which is radiated at an arbitrary timing, exists during the frame length Tf after a lapse of the transmission delay time Td after detecting the idle state during the certain period (Tn+Tf), the receiving device 20 is affected by the interference wave when receiving the frame transmitted by the transmitting device 10. In this case, the receiving device 20 side may recover the received frame using, for example, an error correcting process.

Group e illustrates an example of the idle detection process during the certain period of time (Tn+Tf) where the idle detection process exceeds the time limit of the detection process. In this case, frame transmission may be forcibly performed. The forcibly transmitted frame, which is not based on the determination result of the carrier sense, may be affected by the beacon frame and the interference wave radiated at an arbitrary timing. As described above, the receiving device 20 side may recover the received frame using, for example, the error correcting process.

Thus, in the first embodiment, when the carrier sense process on all channels stipulated by IEEE 802.11b continuously detects the idle state during the certain period of time (Tn+ Tf), the transmitting device 10 transmits the frame after a lapse of the period based on one period of the beacon frame. This eliminates the need for the receiving device 20 to use the narrow band pass filter, which extracts the signal on the specified channel, in order to avoid the influence of the interference wave in the wireless communication between the transmitting device 10 and the receiving device 20.

Second Embodiment

Next, a second embodiment will be described. In the second embodiment, the wideband carrier sense on all channels in the 2.4 GHz band is performed using the method according to the first embodiment, and then a narrowband carrier sense on the channel to be used for the frame transmission is performed.

Figure 9:
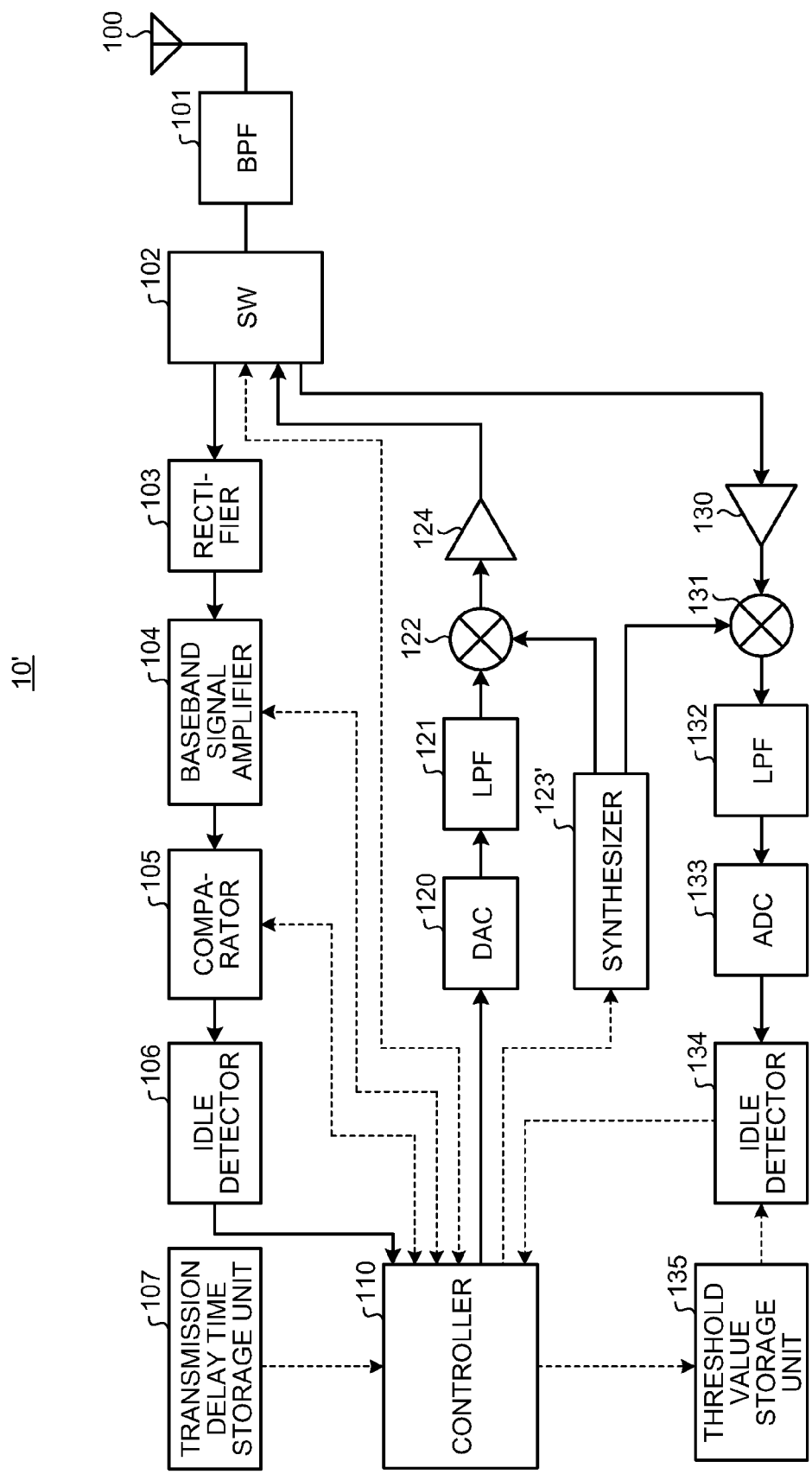
FIG. 9 is a block diagram illustrating an exemplary configuration of a transmitting device according to a second embodiment.

FIG. 9 illustrates an exemplary configuration of a transmitting device 10' according to the second embodiment. In FIG. 9, the common constituent elements with FIG. 5 are designated by the same reference numerals, and the detailed explanation thereof is not repeated here. The transmitting device 10' includes a configuration to perform the narrowband carrier sense in addition to the configuration of the transmitting device 10 illustrated in FIG. 5. The configuration to perform the narrowband carrier sense includes a low-noise amplifier 130, a mixer 131, a lowpass filter 132, an AD converter (ADC) 133, an idle detector 134, and a threshold value storage unit 135.

A RF signal, which is output from the switch 102, is amplified by the low-noise amplifier 130 and then supplied to the mixer 131. The synthesizer 123' generates the high-frequency signal with a predetermined frequency in accordance with a control signal supplied by the controller 110 in a manner to convert a RF signal within a frequency band range of the specific channel into a baseband signal. The mixer 131 converts the RF signal, which is supplied from the low-noise amplifier 130, into the baseband signal using the high-frequency signal output from the synthesizer 123' and then outputs the baseband signal.

The baseband signal, which is output from the mixer 131, undergoes a filtering process by the lowpass filter 132 and is then output. In a filtering process, low-frequency components of the signal are passed through the lowpass filter 132 and high-frequency components of the signal are attenuated. The baseband signal, which is an analog signal output from the lowpass filter 132, is converted into a digital signal by the ADC 133.

The baseband signal, which is converted into a digital signal by the ADC 133, is supplied to the idle detector 134. The idle detector 134 reads a threshold value stored in the threshold value storage unit 135 and compares the baseband signal in digital form supplied from the ADC 133 with the read threshold value. The threshold value storage unit 135 stores therein the threshold value, which is input by the controller 110.

The idle detector 134 determines whether H level or L level based on a comparison result between the value of the baseband signal and the threshold value. When the value of the baseband signal is equal to or more than the threshold value, it is determined to be H level. When the value of the baseband signal is less than the threshold value, it is determined to be L level. The idle detector 134 determines that the idle state is detected when L level remains for a predetermined period.

The idle detector 134 continues to compare the supplied baseband signal with the threshold value until the idle state is detected. The idle detector 134 outputs control information to the controller 110 in order to notify the detection result when the idle state is detected.

Figure 10:
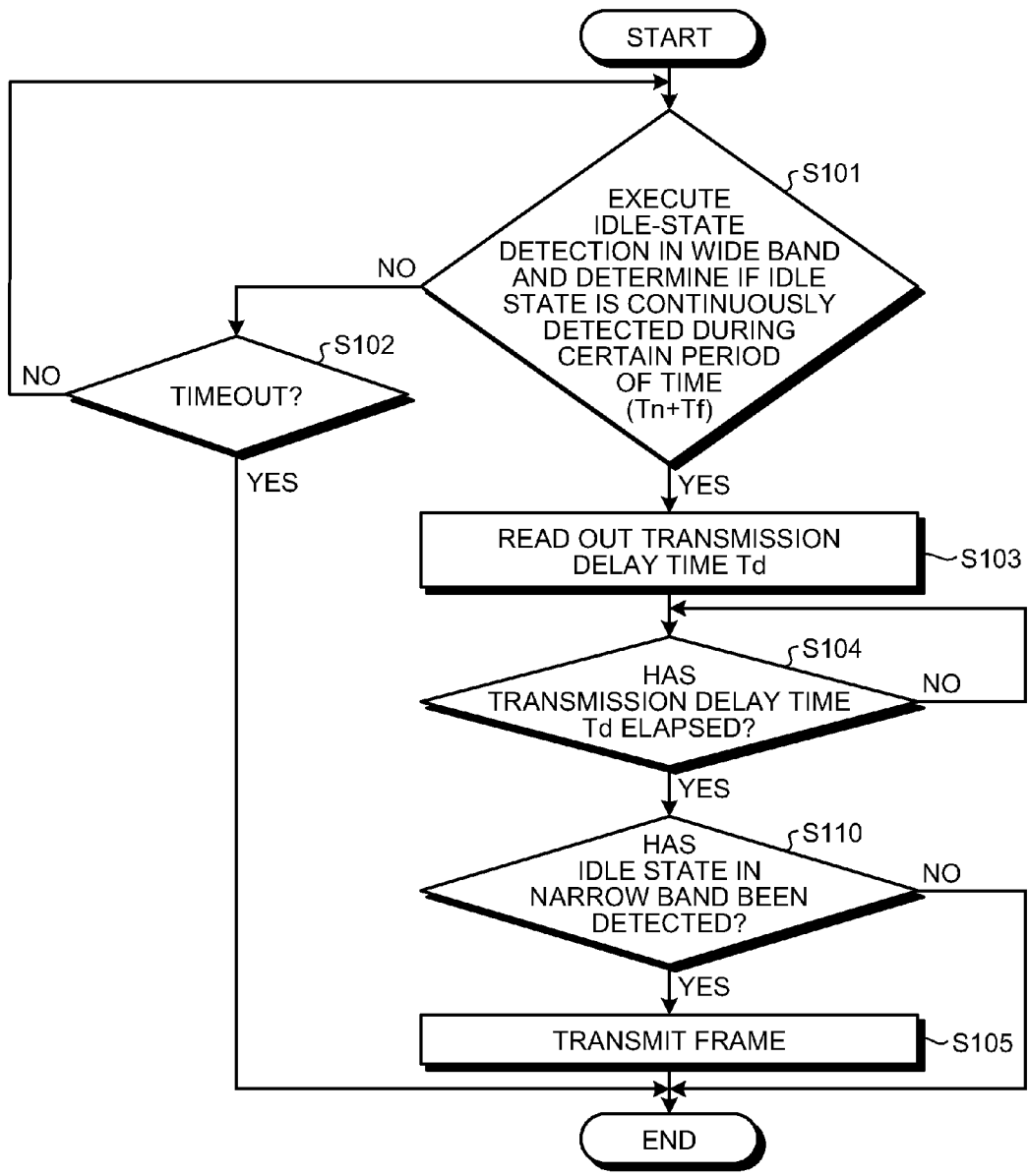
FIG. 10 is a flowchart illustrating an exemplary CS process according to the second embodiment.

The carrier sense process according to the second embodiment will be described by referring to a flowchart illustrated in FIG. 10. In the flowchart of FIG. 10, the common processes with the flowchart of FIG. 6 are designated by the same step numbers, and the detailed explanation thereof is not repeated here.

In step S101, the idle detector 106 determines whether the idle state is detected using the comparison result of the comparator 105 based on the signal received from the antenna 100. When the comparison result supplied from the comparator 105 is a signal of H level, in other words, it is determined that the idle state is not detected, the process proceeds to step S102 to perform the timeout determination. When it is determined that the timeout has not occurred, the process returns to step S101 to continue detection of the idle state.

On the other hand, when the idle detector 106 determines that the timeout has occurred in step S102, the idle detector 106 outputs the failure result of the determination to the controller 110. When the controller 110 receives the failure result of the determination from the idle detector 106, the controller 110 terminates a sequence of processes according to the flowchart without performing frame transmission. At this time, the controller 110 may further output control information to a user interface (not shown) to notify the user of not transmitting.

In step S101, when the idle detector 106 determines that the comparator 105 has supplied a signal of L level as the comparison result, which indicates that the idle state is detected, the idle detector 106 further determines whether the idle state is continuously detected during the certain period of time (Tn+Tf). When it is determined that the idle state is continuously detected during the certain period of time (Tn+Tf), the idle detector 106 outputs the success result of the determination to the controller 110. When the controller 110 receives the success result of the determination from the idle detector 106, the process proceeds to step S103.

In step S103, the controller 110 reads out the transmission delay time Td from the transmission delay time storage unit 107. In the following step S104, the controller 110 waits for the transmission delay time Td to elapse. When it is determined that the transmission delay time Td has elapsed, the controller 110 advances the process to step S110.

In step S110, the controller 110 performs idle detection within the transmission frequency band in which the frame transmission is to be performed.

Specifically, the controller 110 outputs a control signal to the switch 102 so as to control the switch 102 to couple the wide band pass filter 101 and the low-noise amplifier 130. Then the controller 110 waits for the determination result from the idle detector 134. The idle detector 134 detects the idle state based on the threshold value, which is read from the threshold value storage unit 135, and the value of the baseband signal, which is supplied from the ADC 133. When the idle detector 134 determines that the idle state is detected, the idle detector 134 outputs a control signal to the controller 110 in order to notify the detection result.

In step S110, when the idle detector 134 determines that the idle state is not detected during the predetermined period, the idle detector 134 outputs the failure result of the determination to the controller 110. When the controller 110 receives the failure result of the determination from the idle detector 134, the controller 110 terminates a sequence of processes according to the flowchart without performing frame transmission. At this time, the controller 110 may further output control information to a user interface (not shown) to notify the user of not transmitting.

When the controller 110 receives the control information, which indicates the idle state has been detected, from the idle detector 134, the controller 110 advances the process to step S105 to perform frame transmission. That is, the controller 110 controls the switch 102 to couple the power amplifier 124 and the wide band pass filter 101, and outputs the transmission signal to the DAC 120, thus performing the frame transmission.

As described above, according to the second embodiment, the frame transmission can be performed after determining that the channel within the frequency band, which is used for the frame transmission, is in the idle state. This allows the frame transmission without being affected by the interference from the transmission channel. Additionally, this can avoid interference from another wireless communication equipment, which performs transmission using the transmission channel.

Third Embodiment

Next, a third embodiment will be described. Since a transmitting device according to the third embodiment is constituted with the same configuration of the transmitting device 10' according to the second embodiment described by referring to FIG. 9, the transmitting device according to the third embodiment will be described by referring to FIG. 9. In the third embodiment, the threshold value storage unit 135 stores therein a threshold value, which has a lower value than the threshold value with which the comparator 105 compares with the base band signal. Accordingly, the idle detector 134 can detect H level, which is a lower level than H level detected by the comparator 105 with the base band signal.

For example, the threshold value with which the comparator 105 compares the base band signal is set to be larger than the carrier sense level stipulated by IEEE 802.11b while the threshold value that is stored in the threshold value storage unit 135 is set to be equal to the carrier sense level stipulated by IEEE 802.11b. At the same time, the transmission signal to be output from the controller 110 is brought into compliance with IEEE 802.11b. This allows the transmitting device 10' according to the third embodiment to perform frame transmission as the transmitting device compliant with IEEE 802.11b.

This allows the transmitting device 10' according to the third embodiment to be applied to an existing wireless LAN product. The transmitting device 10' according to the third embodiment may be used as the wireless LAN product compliant with IEEE 802.11b.

Surely the transmitting device according to the third embodiment can avoid an influence of the interference wave in the wireless communication with the receiving device 20, similarly to the above-described transmitting device 10 according to the first embodiment and the transmitting device 10' according to the second embodiment.

Fourth Embodiment

Next, a fourth embodiment will be described. Since a transmitting device according to the fourth embodiment is constituted with the same configuration of the transmitting device 10' according to the second embodiment described by referring to FIG. 9, the transmitting device according to the fourth embodiment will be described by referring to FIG. 9.

In the case where an interference wave has electric power at comparatively low level, the receiving device 20 side may be able to remove the influence of the interference wave. For example, assume that a received power of the interference wave, which is received by carrier sensing by the transmitting side, exceeds the threshold value of the comparator 105. Even in this case, a transmitting source of the interference wave may have a propagating path that is different from respective propagating paths from the receiving device 20 and the transmitting device 10'. This causes a possibility that the received power of the interference wave when received by the receiving device 20 does not reach the threshold value of the comparator 205 at the receiving device 20. Further, even in the case where the receiving device 20 receives the power of an interference wave that reaches the threshold value of the comparator 205, if a signal-to-interference ratio (SIR) is sufficiently large, the receiving device 20 may reduce the influence of the interference wave with low received power by automatic gain control (AGC).

Therefore, in the fourth embodiment, in the case where the wideband carrier sense fails to detect the idle state within the certain period of time (Tn+Tf), the baseband signal amplifier 104 decreases in gain while keeping the threshold value of the comparator 105. This decreases the signal level, which is input to the comparator 105. Then, the idle-state detection is performed again while keeping the decreased signal level of the input signal of the comparator 105.

That is, the interference wave may have a large electric power at the position of the transmitting device 10' and a small electric power at the position of the receiving device 20 depending on, for example, positional relationships of the transmitting source of the interference wave to the transmitting device 10' and the receiving device 20. In this case, it is possible to avoid the following situation. Although the receiving device 20 side can receive frames from the transmitting device 10' without being affected by the interference wave, the frame transmission is not performed because the idle state is not detected during the certain period of time (Tn+Tf) at the transmitting device 10'.

Decreasing the signal level of the signal input to the comparator 105 without varying the threshold value of the comparator 105 has the same meaning as setting the threshold value of the comparator 105 to a larger value without varying the signal level of the input signal of the comparator 105.

Figure 11:
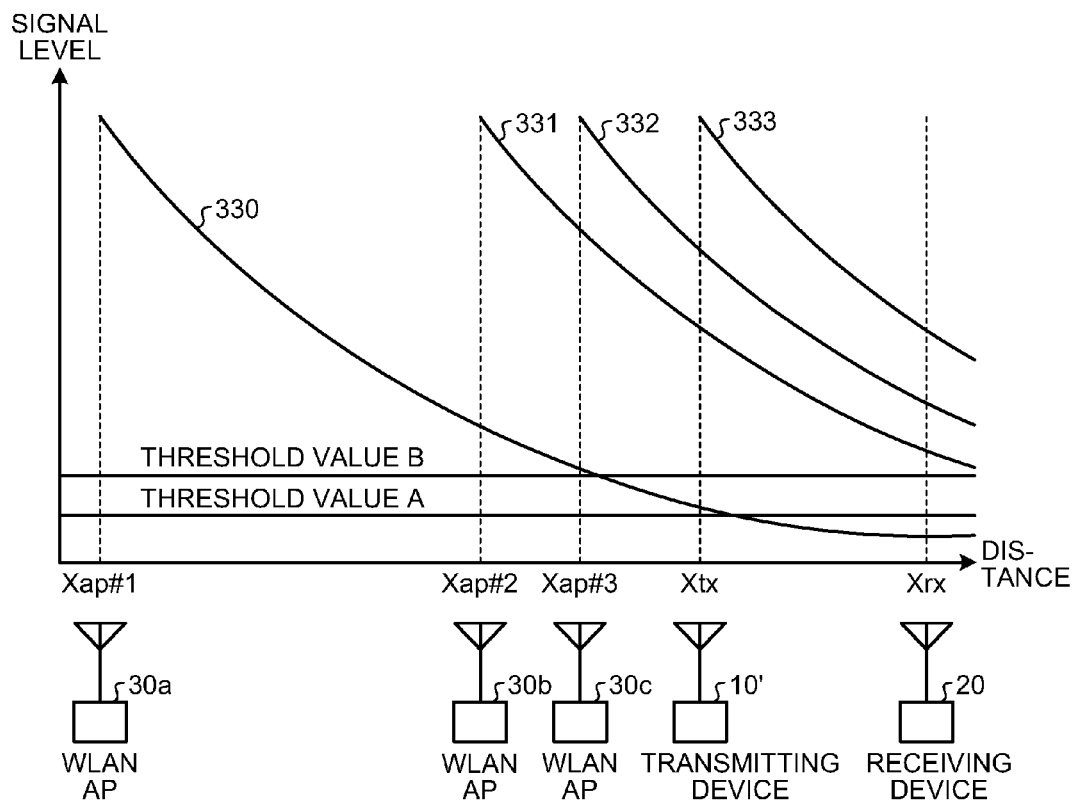
FIG. 11 is a schematic diagram illustrating an exemplary relationship between positional relationships and signal levels of respective access points, a transmitting device, and a receiving device.

The fourth embodiment will be more specifically described. FIG. 11 illustrates a relationship between positional relationships and signal levels of the access points 30a, 30b, and 30c, the transmitting device 10', and the receiving device 20. The horizontal axis indicates, for example, relative distances of the access point 30a, the access point 30b, the access point 30c, distances of the transmitting device 10', and the receiving device 20 from the access point 30a as the reference. The vertical axis indicates signal levels of the beacon frames 330, 331, 332, and 333, which are respectively transmitted by the access points 30a to 30c and the transmitting device 10'.

As described by referring to FIG. 1, the access points 30a and 30b are access points compliant with IEEE 802.11b and respectively transmit beacon frames on 1 ch and 6 ch in the frequency band of a 2.4 GHz band at an interval of 102.4 msec. The receiving device 20 receives the frames on all channels in the 2.4 GHz band.

The access point 30c is an access point compliant with IEEE 802.11b and transmits a beacon frame on 11 ch in the frequency band in the 2.4 GHz band at the interval of 102.4 msec.

The transmitting device 10' according to the fourth embodiment transmits a wireless signal that can be received at the receiving device 20 in the frequency band of 11 ch in the 2.4 GHz band compliant with IEEE 802.11b. At the same time, the transmitting device 10' can receive signals on all channels compliant with IEEE 802.11b for carrier sense. That is, the transmitting device 10' can receive the signal in the frequency band of 1 ch from the access point 30a, and the signal in the frequency band of 6 ch from the access point 30b, and the signal in the frequency band of 11 ch from the access point 30c.

As illustrated in the horizontal axis of FIG. 11, the respective access points 30a to 30c, the transmitting device 10', and the receiving device 20 are assumed to be aligned in a straight line in the order of the access point 30a, the access point 30b, the access point 30c, the transmitting device 10', and the receiving device 20. Positions of the respective access points 30a to 30c, the transmitting device 10', and the receiving device 20 are respectively indicated as positions Xap#1, Xap#2, Xap#3, Xtx, and Xrx. It is assumed that the access points 30a, 30b, and 30c, and the transmitting device 10' respectively transmit transmission signals 330, 331, 332, and 333, which have the identical signal level. It is also assumed that the signal levels of the transmitted beacon frames obey Friis's transmission law.

In the transmitting device 10', in the case where the threshold value of the comparator 105 is set to the threshold value A, the beacon frames transmitted from the respective access points 30a to 30c in carrier sense are all detected at H level as comparison results of the comparator 105.

Figure 12:
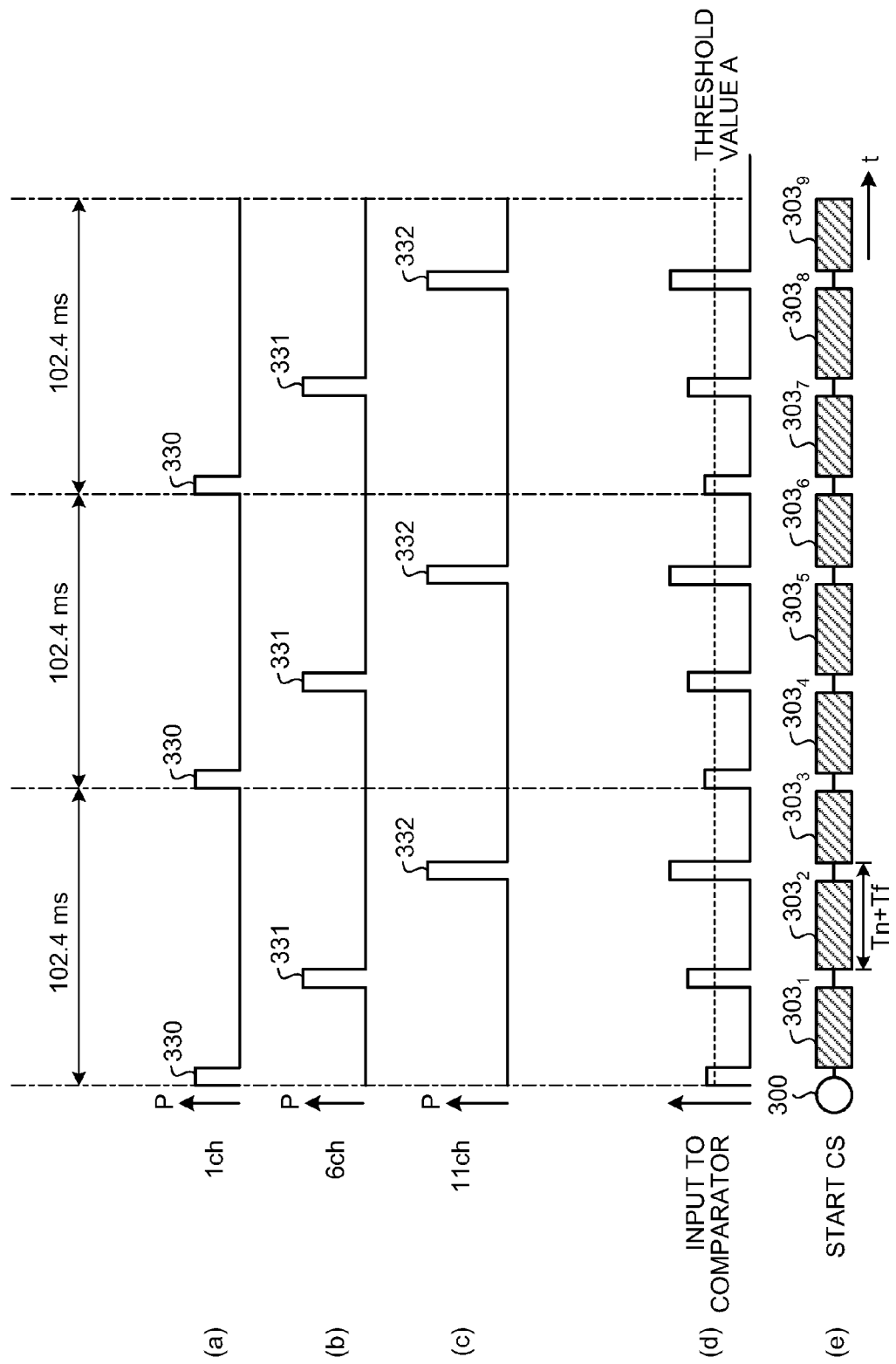
FIG. 12 is a schematic diagram illustrating an exemplary relationship between received powers at the transmitting device and a result of the CS process.

FIG. 12 illustrates an exemplary relationship between the received power levels at the transmitting device 10' and the carrier sense results of the transmitting device 10'. Parts (a), (c), and (c) of FIG. 12 illustrate exemplary received power levels of the respective beacon frames 330, 331, and 332 transmitted at a period of 102.4 msec with a certain amount of electric power using 1 ch, 6 ch, and 11 ch from the access points 30a, 30b, and 30c, respectively.

The received power levels of the beacon frames 330, 331, and 332, which are respectively transmitted from the access points 30a to 30c, depend on the distances of the respective access points 30a to 30c from the transmitting device 10'. Specifically, the beacon frames 330, 331, and 332 increase in the received power levels from the beacon frame 330 on 1 ch, which is transmitted from the access point 30a with the largest distance from the transmitting device 10', to the beacon frame 332 on 11 ch, which is transmitted from the access point 30c with the smallest distance from the transmitting device 10'.

As illustrated in part (d) of FIG. 12, in the case where the threshold value of the comparator 105 is set to the threshold value A as illustrated in FIG. 11, the beacon frames 330, 331, and 332 respectively transmitted from the access points 30a to 30c are all detected at H level as comparison results of the comparator 105. Accordingly, as time periods $303_1$, $303_2$, and so on as exemplarily illustrated in part (e) of FIG. 12, in the case where the transmitting device 10' starts to perform the carrier sense at the timing 300, a detection result with the continuous idle state at every timing of the beacon frames 330, 331, and 332 respectively transmitted from the access points 30a to 30c can be obtained.

In the example of part (e) of FIG. 12, the time periods $303_2$, $303_5$ and so on of the idle state, which are detected between the beacon frame 331 on 6 ch and the beacon frame 332 on 11 ch, are each longer than the time periods of the idle states detected between 1 ch and 6 ch and between 1 ch and 11 ch. However, in this example, the length of the time periods $303_2$, $303_5$ and so on do not reach the certain period of time (Tn+Tf). This causes the idle detector 106 to fail to detect the idle state during period of time (Tn+Tf). Thus the transmitting device 10' does not perform frame transmission.

On the other hand, the receiving device 20 is further separated from the respective access points 30a to 30c than the transmitting device 10'. The receiving device 20 receives the beacon frames 330, 331, and 332, which are respectively transmitted from the access points 30a to 30c, with the power levels lower than the received power levels of the beacon frames 330, 331, and 332 received at the transmitting device 10'.

Assume that the threshold value of the comparator 205 at the receiving device 20 is set to the threshold value A. At the position of the receiving device 20 in the example of FIG. 11, the received power level of the beacon frame 330 at the receiving device 20, which is transmitted from the access point 30a, is less than the threshold value A. Accordingly, the comparison result of the comparator 205 of the receiving device 20 at the timing when the beacon frame 330 is received is determined as L level. When the frame transmitted from the transmitting device 10' is received, the receiving device 20 is not affected by the interference wave.

Figure 13:
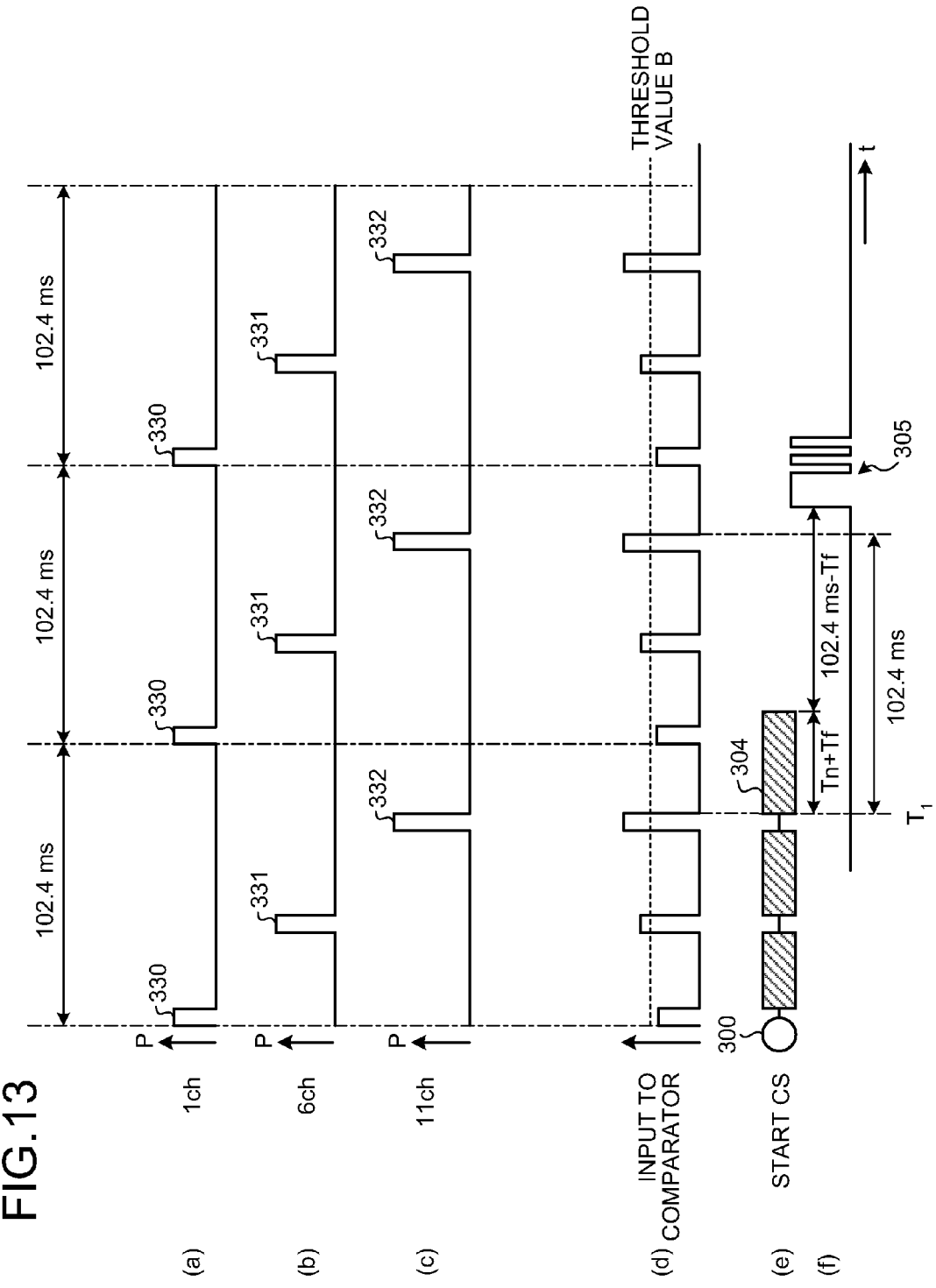
FIG. 13 is a schematic diagram illustrating an exemplary relationship between the received powers at the transmitting device and a result of the CS process.

Next, by referring to FIG. 13, assume that the threshold value of the comparator 105 has a value of the threshold value B that is a higher value than the threshold value A as illustrated in FIG. 11. In this case, for example, as illustrated in part (d) of FIG. 13, in the transmitting device 10', the comparison result of the comparator 105 for the beacon frame 330 is determined as L level while the comparison results of the comparator 105 for other beacon frames 331, and 332 are determined as H level. Accordingly, the idle detector 106 of the transmitting device 10' does not detect the beacon frame 330. Thus, as illustrated as time period 304 in part (e) of FIG. 13, the idle detector 106 succeeds in detecting the idle state during the certain period of time (Tn+Tf) after the output signal of the comparator 105 turns into H level by the beacon frame 332.

When the controller 110 succeeds in detecting the idle state during the certain period of time (Tn+Tf) as described above, the controller 110 reads the transmission delay time Td (which is 102.4 msec minus Tf) from the transmission delay time storage unit 107. The controller 110 then performs transmission of a frame 305 after the transmission delay time Td. Accordingly, after a lapse of the period that is a sum of the period Tn and 102.4 msec as one period of the beacon frame after time $T_1$, which is the head of the certain period of time (Tn+Tf), the transmission of the frame 305 is performed.

The receiving device 20 is affected by 6 ch and 11 ch respectively received from the access points 30b and 30c. On the other hand, in the case where the threshold value of the comparator 205 of the receiving device 20 is set to the threshold value A, as illustrated in FIG. 11, the receiving device 20 is not affected by the beacon frame 330 on 1 ch received from the access point 30a. Accordingly, the transmitting device 10' transmits the frames from time $T_1$ at an interval of 102.4 msec, which is the interval of the respective beacon frames 330, 331, and 332. This allows the receiving device 20 to receive the frames transmitted from the transmitting device 10' without being affected by the beacon frames 330, 331, and 332 respectively transmitted from the access points 30a, 30b, and 30c.

Figure 14:
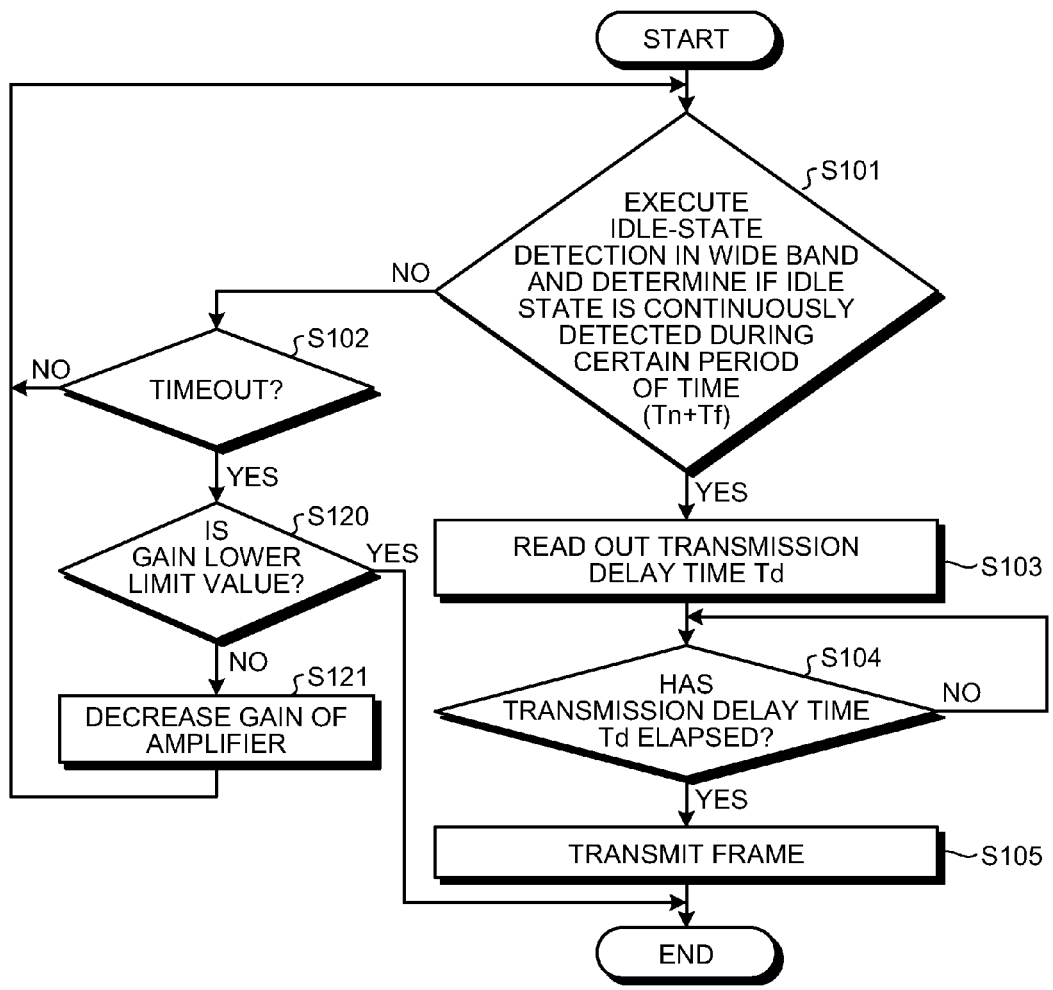
FIG. 14 is a flowchart illustrating an example of a CS process according to a fourth embodiment.

The carrier sense process according to the fourth embodiment will be described by referring to a flowchart in FIG. 14. In the flowchart of FIG. 14, the common processes with the flowchart of FIG. 6 are designated by the same step numbers, and the detailed explanation thereof is not repeated here.

In step S101, the idle detector 106 determines whether the idle state is detected based on the comparison result of the comparator 105 based on the signal received from the antenna 100. When it is determined that the idle state is not detected, the process proceeds to step S102 to perform the timeout determination. The timeout determination determines whether a certain period of time $T_{CS1st}$ has elapsed after an execution of process of step S121, which will be described later, or a start of the carrier sense. When it is determined that the certain period of time $T_{CS1st}$ has not elapsed, it is determined that the timeout has not occurred and the process then returns to step S101 and continues the idle-state detection.

On the other hand, when the idle detector 106 determines that the timeout has occurred in step S102, the idle detector 106 notifies the determination result to the controller 110. When the controller 110 receives the notification of the timeout from the idle detector 106, the controller 110 advances the process to step S120 to determine whether the baseband signal amplifier 104 has the gain with the lower limit value. When it is determined that the gain has the lower limit value, the controller 110 terminates a sequence of processes according to the flowchart without performing the frame transmission.

In step S120, when the controller 110 determines that the gain of the baseband signal amplifier 104 is not the lower limit value, the controller 110 advances the process to step S121. In step S121, the controller 110 transmits a control signal to the baseband signal amplifier 104 in order to decrease the gain of the baseband signal amplifier 104 by a predetermined range. This relatively increases the threshold value of the comparator 105. The controller 110 then returns the process to step S101 to start the idle detection by the idle detector 106 again.

In the above-described step S101, when it is determined that the idle state is detected, the idle detector 106 further determines whether the idle state is continuously detected during the certain period of time (Tn+Tf). When it is determined that the idle state is continuously detected during the certain period of time (Tn+Tf), the idle detector 106 outputs the success result of the determination to the controller 110. When the controller 110 receives the success result of the determination from the idle detector 106, the controller 110 advances the process to step S103.

In step S103, the controller 110 reads the transmission delay time Td from the transmission delay time storage unit 107. In the following step S104, the controller 110 waits for the transmission delay time Td to elapse. When the controller 110 determines that the transmission delay time Td has elapsed, the controller 110 advances the process to step S105 and performs the frame transmission. That is, the controller 110 controls the switch 102 to couple the power amplifier 124 and the wide band pass filter 101, and outputs the transmission signal to the DAC 120 to perform the frame transmission.

Accordingly, in the fourth embodiment, when the idle state during the certain period of time (Tn+Tf) is not detected at the time of carrier sense by the transmitting device 10', the idle-state detection is restarted with the increased carrier sense level. This allows the transmitting device 10' to perform the frame transmission in the case where the interference wave has the comparatively high received power level at the transmitting device 10' and the low received power level at the receiving device 20, and the receiving device 20 side may be able to remove the influence of the interference wave.

Fifth Embodiment

Figure 15:
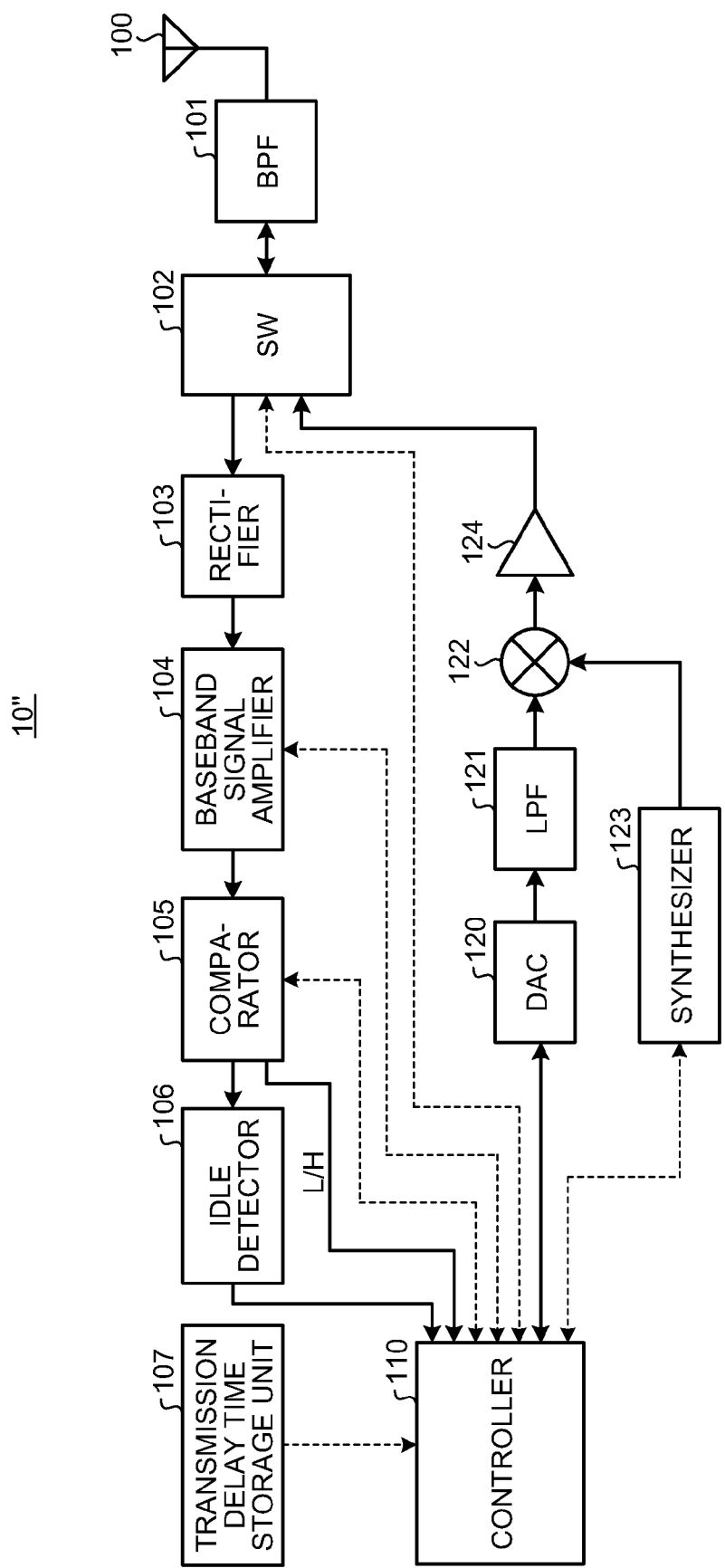
FIG. 15 is a block diagram illustrating an exemplary configuration of a transmitting device according to a fifth embodiment.

Next, a fifth embodiment will be described below. FIG. 15 illustrates an exemplary configuration of a transmitting device 10" according to the fifth embodiment. In FIG. 15, the common constituent elements with FIG. 5 are designated by the same reference numerals, and the detailed explanation thereof is not repeated here. The transmitting device 10" according to the fifth embodiment is different from the transmitting device 10 according to the first embodiment illustrated in FIG. 5 in that the comparator 105 and the controller 110 are coupled to one another with a signal line, and the signal of H level or L level generated by the comparator 105 is directly supplied to the controller 110 through the signal line.

In the fifth embodiment, prior to the idle detection process during the certain period of time (Tn+Tf), an autocorrelation coefficient is calculated from the received signal, and the period of the interference wave is obtained based on the obtained autocorrelation coefficient. The transmitting device 10 performs a carrier sense process at the time of performing the frame transmission, based on the period of the interference wave obtained from the autocorrelation coefficient.

The process according to the fifth embodiment will be described more specifically. The following process is, for example, regularly performed by the controller 110. The controller 110 controls the switch 102 to couple the wide band pass filter 101 and the rectifier 103 at a predetermined timing. The received signal, which is output from the antenna 100, is supplied to the rectifier 103 through the wide band pass filter 101 and the switch 102. The baseband signal, which is obtained by rectifying the received signal at the rectifier 103, is supplied to the comparator 105 through the baseband signal amplifier 104. The comparator 105 then compares the baseband signal with the threshold value. The signal of L level or H level of the comparison result is supplied to the controller 110.

The controller 110 calculates the value of the autocorrelation coefficient from the signal of L level and H level, which is supplied from the comparator 105. The controller 110 detects local maximal values of the calculated autocorrelation coefficient, selects local maximal values that exceeds a predetermined value from the detected local maximal values, and selects the local maximal value with the minimum delay time from the selected local maximal values. The minimum delay time of this selected local maximal value of the autocorrelation coefficient is obtained as the period of the interference wave and stored in, for example, a register of the controller 110.

This process is not necessarily performed at regular intervals. This process may be performed in response to, for example, a power-on of the transmitting device 10 or an instruction from an upper layer (not shown) to the transmitting device 10.

Accordingly, the period of the interference wave, which is obtained based on the autocorrelation coefficient, is used instead of 102.4 msec, which is the period of the above-described beacon frame, and the carrier sense process is performed. The carrier sense process is, for example, a process described by referring to FIG. 6.

According to the fifth embodiment, not only the beacon frame at the period of 102.4 msec stipulated by IEEE 802.11b but also another period of the interference wave may be detected. Thus the transmitting device 10" according to the fifth embodiment can perform timing control of the carrier sense process and the frame transmission according to the period of the detected interference wave.

For example, assume that an access point of a wireless LAN that transmits the beacon frame at the period of 102.4 ms is located within a range where the transmitting device 10 and the receiving device 20 can receive the beacon frame. In the calculation of the autocorrelation coefficient based on the received signal at the transmitting device 10, the autocorrelation coefficient has a value that increases in delay times of 102.4 ms multiplied by n (n is a natural number) such as 102.4 ms, 204.8 ms, and 307.2 ms. Thus, with this calculation of the autocorrelation coefficient, the smallest delay time is selected from the delay times of the autocorrelation coefficients larger than a predetermined value.

As described above, not only 102.4 ms of the default period of the beacon frame of IEEE 802.11b but also another period of the interference wave can be detected as the interference source. Accordingly, a wireless communication between the transmitting device 10 and the receiving device 20 is possible without being affected by the interference wave.

While in the above description, the fifth embodiment is applied to the transmitting device 10 according to the first embodiment, this should not be construed in a limiting sense. The fifth embodiment may be applied to the transmitting device 10' according to the second to the fourth embodiments. In this configuration, the period obtained based on the autocorrelation coefficient calculated from the received signal may be used instead of the period of 102.4 msec of the beacon frame of IEEE 802.11b, and carrier sense processes according to the respective embodiments may be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitting device comprising:
a transmitter configured to transmit a frame;
a first carrier sensor configured to perform carrier sense to detect interference which affects reception of the frame at a receiving device, the carrier sense being performed in a wider bandwidth than a signal bandwidth to be used for a transmission of the frame by the transmitter; and
an idle detector configured to determine whether idle detection by the first carrier sensor succeeds, wherein the idle detector determines that the idle detection succeeds if the first carrier sensor continuously detects an idle state for a first period that is equal to or more than a duration of a frame length of the frame to be transmitted by the transmitter, the idle state being detected if the first carrier sensor does not detect interference,
wherein the transmitter is configured to, if the idle detector determines that the idle detection succeeds, start the transmission of the frame at a timing immediately after a lapse of a second period which begins immediately after a lapse of the first period during which the idle state is continuously detected, and
wherein the second period is calculated by subtracting the duration of the frame length of the frame to be transmitted by the transmitter from a period of an interference wave.

2. The device according to claim 1, further comprising a second carrier sensor configured to perform carrier sense in the signal bandwidth immediately before the transmitter starts the transmission of the frame,
wherein the transmitter is configured to, if an idle state is detected as a result of the carrier sense by the second carrier sensor, start the transmission of the frame.

3. The device according to claim 2, wherein the second carrier sensor is configured to perform carrier sense at a lower carrier sense level than a carrier sense level of the first carrier sensor.

4. The device according to claim 1, wherein the first carrier sensor is configured to, if the idle detector determines that the idle detection fails, perform another carrier sense at an increased level of carrier sense, and the transmitter is configured to, if the idle detector determines that the idle detection succeeds as a result of the other carrier sense, start the transmission of the frame at said timing immediately after a lapse of the second period.

5. The device according to claim 1, wherein the period of the interference wave is calculated from an autocorrelation coefficient of a signal, the signal being obtained by carrier sense performed by the first carrier sensor.

6. The device according to claim 5, wherein the period of the interference wave is a minimum delay time among delay times of local maximal values of the autocorrelation coefficient.

7. The device according to claim 1, wherein the period of the interference wave is 102.4 msec.

8. The transmitting device according to claim 1, wherein the first period is equal to Tf+Tn, where Tf is the duration of the frame length of the frame to be transmitted by the transmitter, and Tn is a null time which is a period of time that is required for the receiving device to accurately receive a next frame after a reception of an interference wave.

9. A transmitting method comprising:
transmitting a frame with a transmitter;
performing, with a first carrier sensor, carrier sense to detect interference which affects reception of the frame at a receiving device, the carrier sense being performed in a wider bandwidth than a signal bandwidth to be used for a transmission of the frame by the transmitter;
determining, with an idle detector, whether idle detection by the first carrier sensor succeeds, wherein the idle detector determines that the idle detection succeeds if the first carrier sensor continuously detects an idle state for a first period that is equal to or more than a duration of a frame length of the frame to be transmitted in the transmitting with the transmitter, the idle state being detected if the first carrier sensor does not detect interference,
wherein, if the idle detector determines that the idle detection succeeds, the transmission of the frame is started at a timing immediately after a lapse of a second period which begins immediately after a lapse of the first period during which the idle state is continuously detected, and
wherein the second period is calculated by subtracting the duration of the frame length of the frame to be transmitted in the transmitting with the transmitter from a period of an interference wave.

10. The method according to claim 9, further comprising:
performing, with a second carrier sensor, carrier sense in the signal bandwidth immediately before the transmitter starts the transmission of the frame;
wherein the transmission of the frame is started if an idle state is detected as a result of the carrier sense by the second carrier sensor.

11. The method according to claim 10, wherein the carrier sense by the second carrier sensor is performed at a lower carrier sense level than a carrier sense level of the first carrier sensor.

12. The method according to claim 9, wherein:
if the idle detector determines that the idle detection fails, another carrier sense by the first carrier sensor is performed at an increased level of carrier sense; and
if the idle detector determines that the idle detection succeeds as a result of the other carrier sense, the transmission of the frame is started at said timing immediately after a lapse of the second period.

13. The method according to claim 9, wherein the period of the interference wave is calculated from an autocorrelation coefficient of a signal, the signal being obtained by the carrier sense performed by the first carrier sensor.

14. The method according to claim 13, wherein the period of the interference wave is a minimum delay time among delay times of local maximal values of the autocorrelation coefficient.

15. The method according to claim 9, wherein the period of the interference wave is 102.4 msec.

16. The transmitting method according to claim 9, wherein the first period is equal to Tf+Tn, where Tf is the duration of the frame length of the frame to be transmitted by the transmitter, and Tn is a null time which is a period of time that is required for the receiving device to accurately receive a next frame after a reception of an interference wave.

* * * * *